United States Patent
Oshino

(10) Patent No.: US 6,289,133 B1
(45) Date of Patent: *Sep. 11, 2001

(54) IMAGE PROCESSING METHOD AND APPARATUS

(75) Inventor: Takahiro Oshino, Utsunomiya (JP)

(73) Assignee: Canon Kabushiki Kaisha, Toyko (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,894

(22) Filed: Dec. 18, 1997

(30) Foreign Application Priority Data

Dec. 20, 1996 (JP) .................................... 8-354994

(51) Int. Cl.⁷ .............................. G06K 9/44; G06T 5/20; G06T 3/40
(52) U.S. Cl. ......................... 382/261; 382/264; 382/298
(58) Field of Search ..................................... 382/260, 298, 382/264, 255, 256, 257, 258, 299, 300, 274, 132, 261; 358/451, 463, 448

(56) References Cited

U.S. PATENT DOCUMENTS

| | | | | |
|---|---|---|---|---|
| 5,197,108 | * | 3/1993 | Watanabe | 382/47 |
| 5,309,524 | * | 5/1994 | Hirabayashi et al. | 358/451 |
| 5,319,719 | * | 6/1994 | Nakazawa et al. | 382/132 |
| 5,489,990 | * | 2/1996 | Ishikawa | 358/451 |
| 5,646,741 | * | 7/1997 | Horiuchi et al. | 358/451 |
| 5,870,504 | * | 2/1999 | Nemoto et al. | 382/266 |
| 5,875,268 | * | 2/1999 | Miyake | 382/276 |
| 5,926,578 | * | 7/1999 | Fukase et al. | 382/266 |
| 5,943,433 | * | 8/1999 | Avinash | 382/131 |

* cited by examiner

*Primary Examiner*—Scott Rogers
(74) *Attorney, Agent, or Firm*—Fitzpatrick, Cella, Harper & Scinto

(57) ABSTRACT

An image processing system generates un-sharp signals from input image data representing an input image. The system includes a reducing device which reduces the input image, and a blurring device which performs blurring processing on the reduced image. The system also includes an enlarging device which performs enlarging processing on the blurring processed image and outputs the un-sharp signals, and an image processing device performs image processing on the input image based on the un-sharp signals.

18 Claims, 5 Drawing Sheets

AVERAGE PIXEL VALUE WITHIN RANGE

REDUCED TO 1/5

ENLARGED
FIVEROLD

REDUCED TO 1/5

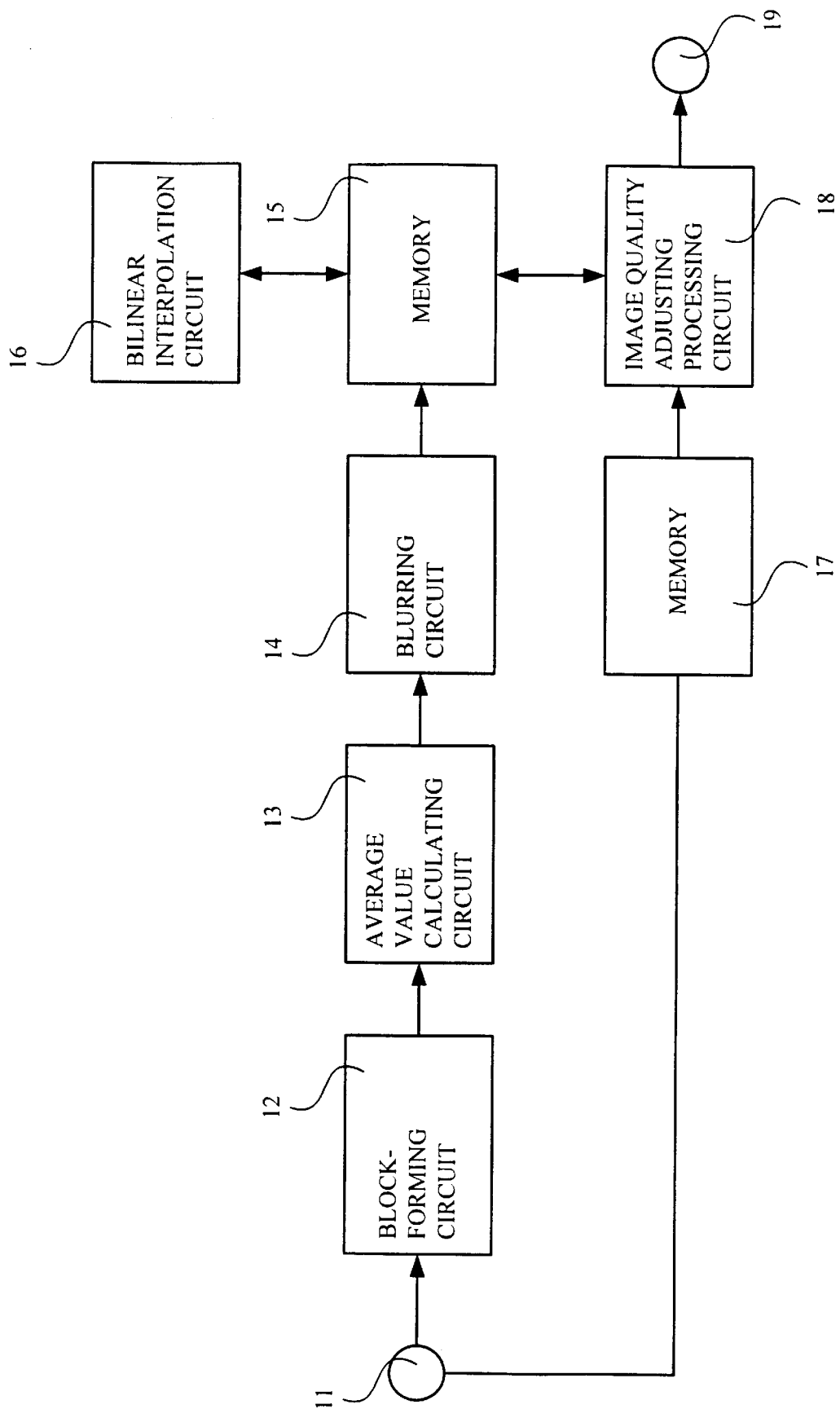

IMAGE PROCESSING METHOD AND APPARATUS

BACKGROUND OF THE INVENTION

1. Field of the Invention

The preset invention relates to an image processing method and apparatus, and particularly to formation of un-sharp signals equivalent to a blurred image, and also to image processing using such un-sharp signals.

2. Description of the Related Art

Un-sharp masking processing is well-known as a means for emphasizing images, and is often employed in the art of photography, and further has recently come to be used as means for emphasis processing of digital images in medical X-ray systems ("Newest Movements in Image Processing Algorithms"; Edited by Takagi, Toriwaki, and Tamura; Shin-Gijutsu Communications).

Now, with the input image as f(x, y), the resultant image g (x, y) obtained by un-sharp masking processing can be expressed as follows in Expression (1):

$$g(x, y) = f(x, y) + c \times \{f(x, y) - f_{av}(x, y)\} \quad (1)$$

Now, $f_{av}(x, y)$ represents the local average value for point (x, y), and is obtained from the n×m pixel area surrounding the point (x, y), and generally can be calculated using a simple average pixel value as shown in the following Expression (2):

$$f_{av}(x, y) = \{1/(n \times m)\} \times \sum_{j=0}^{m-1} \sum_{i=0}^{n-1} f(x-i, y-j) \quad (2)$$

This local average value $f_{av}(x, y)$ represents the blurred image formed by blurring the input image f(x, y), and the greater the surrounding pixel area of which the local average is obtained, the more blurred the image becomes. Further, the second term in Expression (1) includes high-frequency components of the input image due to difference, the un-sharp masking process being to add high-frequency components multiplied by coefficient c to the input image.

Also, a photography method using an analog filter is known in medical X-ray radiography, for allowing for better observation of the mediastinum in simple chest photography and chest tomography, which can be realized by processing the image captured with normal radiography, even without using analog filters. ("Development of self-compensating digital filters with CR"; Ohtani et al; Japan Radiation Technology Association Magazine, Volume 45, Issue 8, p.1030, 1989)

The resultant image g'(x, y) from processing by this self-compensating digital filtering process can be expressed by the following Expression (3):

$$g'(x, y) = f(x, y) + F\{f_{av}(x, y)\} \quad (3)$$

wherein (x, y) represents the input image, and also wherein $f_{av}(x, y)$ represents the local average value for point (x, y) and indicates the blurred image of which the input image f(x, y) has been blurred, as with Expression (1). Also, F{*} is a function representing an analog filter.

However, with the above-described un-sharp masking processing and self-compensating digital filtering process in the known example, both are image processing using a blurred image represented by $f_{av}(x, y)$, so the amount of calculations for creating the blurred image has been the predominant factor in the processing time thereof.

Also, there is a problem in the creation of the blurred image, in that enlarging the n×m pixel area for calculating the local average value to obtain an image with a greater amount of blurring substantially decreases processing speed. For example, in the event that the n×m pixel area for calculating the local average value is multiplied by k (an integral wherein k>0), the area for calculating the local average value becomes:

$$Kn \times Km = K^2 \times (n \times m)$$

so that the amount of calculation for calculating the local average value for a certain point (x, y) is multiplied by $k^2$.

SUMMARY OF THE INVENTION

The present invention has been made in order to solve problems such as those described above, and accordingly, it is an object of the present invention to provide an image processing method and apparatus which is capable of speedily creating un-sharp signals.

In order to achieve this object, an embodiment of the image processing method and apparatus employs a process wherein the number of pixels of the original image is temporarily reduced, following which un-sharp processing is performed on the image of which the number of pixels has been reduced, and the number of pixels of image signals to which un-sharp processing has been performed is increased by means of interpolation, thus regaining the original number of pixels.

Other objects and characteristics of the present invention will become clear from the following detailed description of the embodiments of the invention with reference to the drawings.

BRIEF DESCRIPTION OF THE DRAWINGS

FIG. 6 is a block diagram illustrating the overall configuration of an image processing apparatus according to another embodiment of the present invention.

DETAILED DESCRIPTION OF THE PREFERRED EMBODIMENTS

The following is a detailed description of the embodiments of the present invention, with reference to the drawings.

Figure 1:
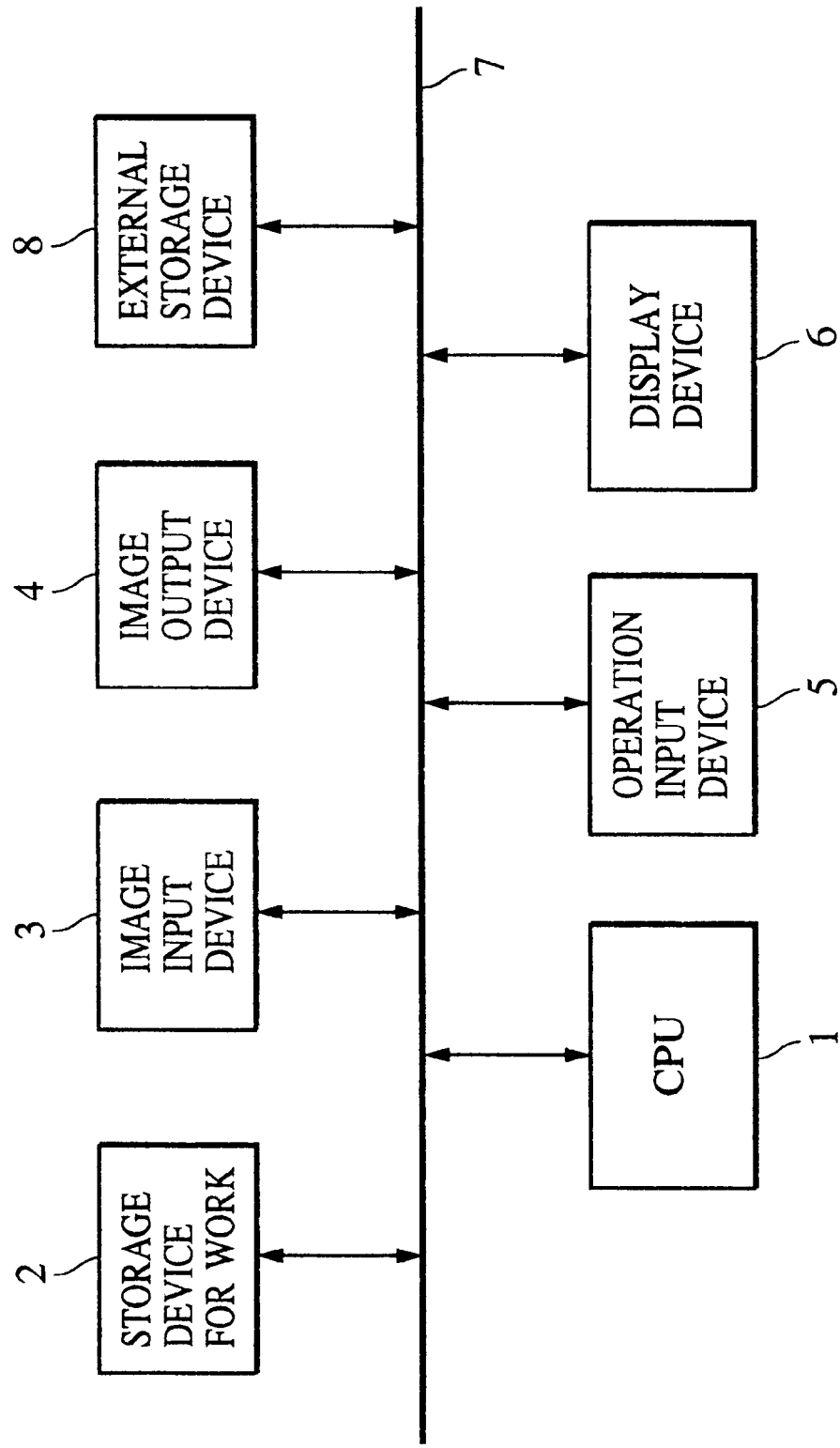
FIG. 1 is a block diagram illustrating the overall configuration of an image processing apparatus according to an embodiment of the present invention.

FIG. 1 is a block diagram illustrating the overall configuration of an image processing apparatus according to the present invention, and in the FIG. 1 denotes a central processing unit (CPU) for centrally executing control of the overall image processing, and the outputs of the storage device for work 2 which serves as the main storage area and work area for this central processing unit, image input devices 3 such as scanners, cameras, etc., image output devices 4 for outputting the results of processing to printers or film, operation input devices 5 for inputting the amount of blurring to the main apparatus by keyboard or mouse, and operation display devices 6 such as CRTS, liquid crystal monitors, etc. for displaying the values input to the main apparatus or the state of the apparatus, are mutually connected via a system bus 7. also, according to the present embodiment, image data input from the image input devices 3 or image data stored in an external storage device 8 may be processed as image data.

Figure 2:
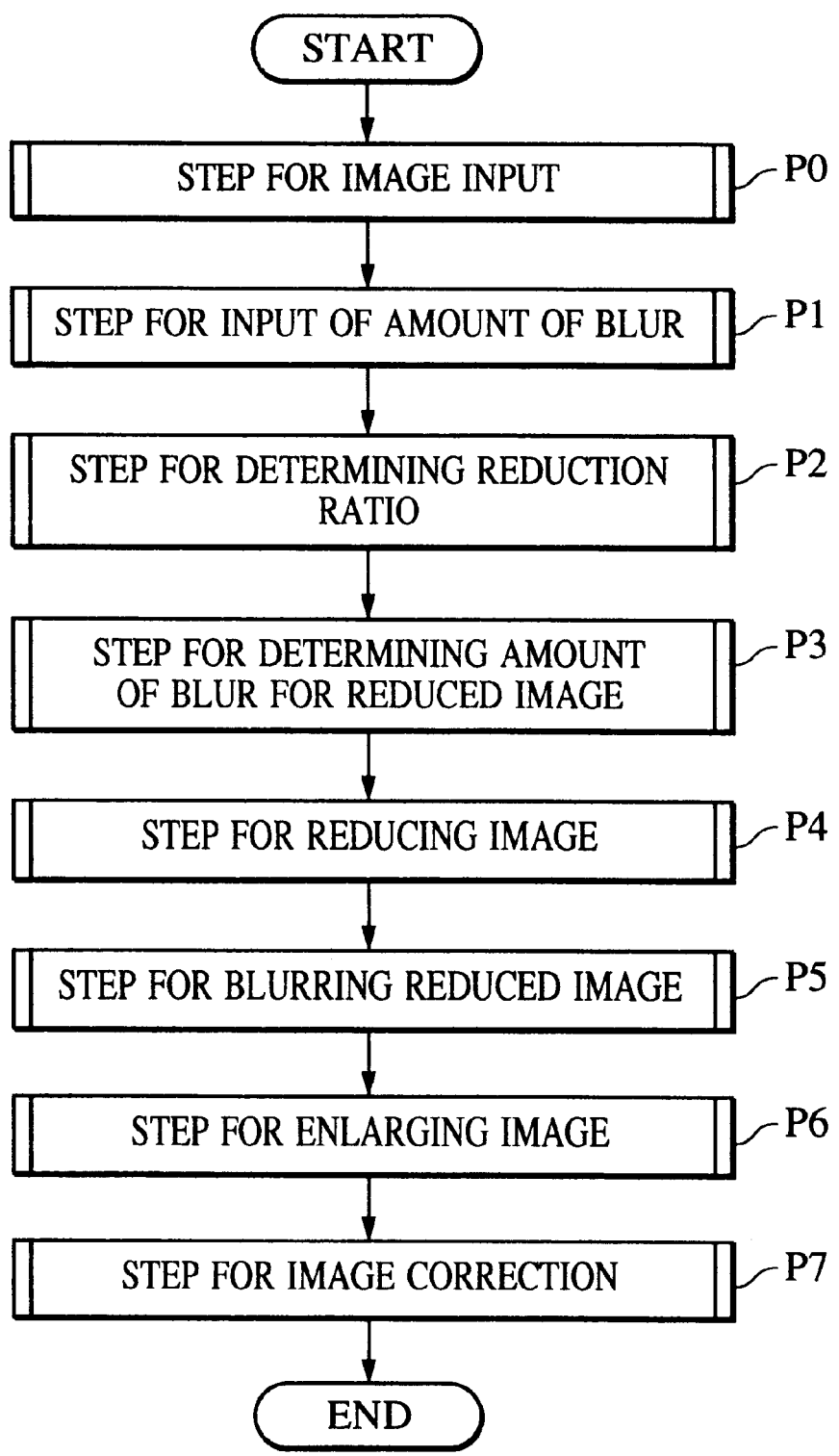
FIG. 2 is a flowchart for describing the operation of the apparatus shown in FIG. 1.

FIG. 2 is a flowchart for describing the operation of the apparatus shown in FIG. 1, wherein processing is performed to an input image S0 input at the image input step P0. First, a certain amount of blurring S1 is input at the step for input of amount of blur P1, and the amount of blurring S1 input at the step for input of amount of blur P1 is used for calculating a rate of reduction S2 for reducing the image in the step for determining reduction ratio P2. The amount of blur S3 for performing blurring to the reduced image is determined in the step for determining amount of blur for reduced image P3, based on the amount of blurring S1 input at the step for input of amount of blur P1 and the rate of reduction S2 for reducing the image in the step for determining reduction ratio P2. Incidentally, the term "image reduction" here refers to the later-described process of reducing the number of pixels provided to the subsequent processes.

Next, in the step for reducing image P4, the input image S0 is reduced based on the rate of reduction S2 determined in the step for determining reduction ratio P2, thus obtaining a reduced image S4. In the step for blurring reduced image P5, a reduced blurred image S5 is created based on the amount of blur S3 determined in the step for determining amount of blur for reduced image P3 and the reduced image S4 reduced in the step for reducing image P4. Next, the reduced blurred image S5 created in the step for blurring reduced image P5 is enlarged in the step for enlarging image P6 until the image is the same size as the input image S0, thus outputting an enlarged blurred image S6. Incidentally, the term "image enlarging" here refers to the later-described process of increasing the number of pixels so as to equal the number of pixels of the input image.

Now, with the amount of blurring S1 to be input in the step for input of amount of blur P1, i.e., the size N×M of the pixel area for calculating the local average value, as 15×15, and with the size of the input image as x×Y (X>N, Y>M), the rate of reduction h for reducing the input image to 1/h should be selected from an integer which does not exceed the desired amount of blurring N and M, and also whereby N and M are divisible. That is, since N=M=15, selection is made from integers whereby N and M as dividends are divisible and do not exceed N and M, e.g., h=5 in this case.

Next, in the step for determining amount of blur for reduced image P3, the amount of blur S3 to be applied to the reduced image is determined. That is, based on the rate of reduction h determined in the step for determining reduction ratio P2, the amount of blur S3 for the reduced image is determined to be (N/h)×(M/h), and since 15/5=3, the amount of blur S3 for the reduced image is 3×3.

Figure 3:
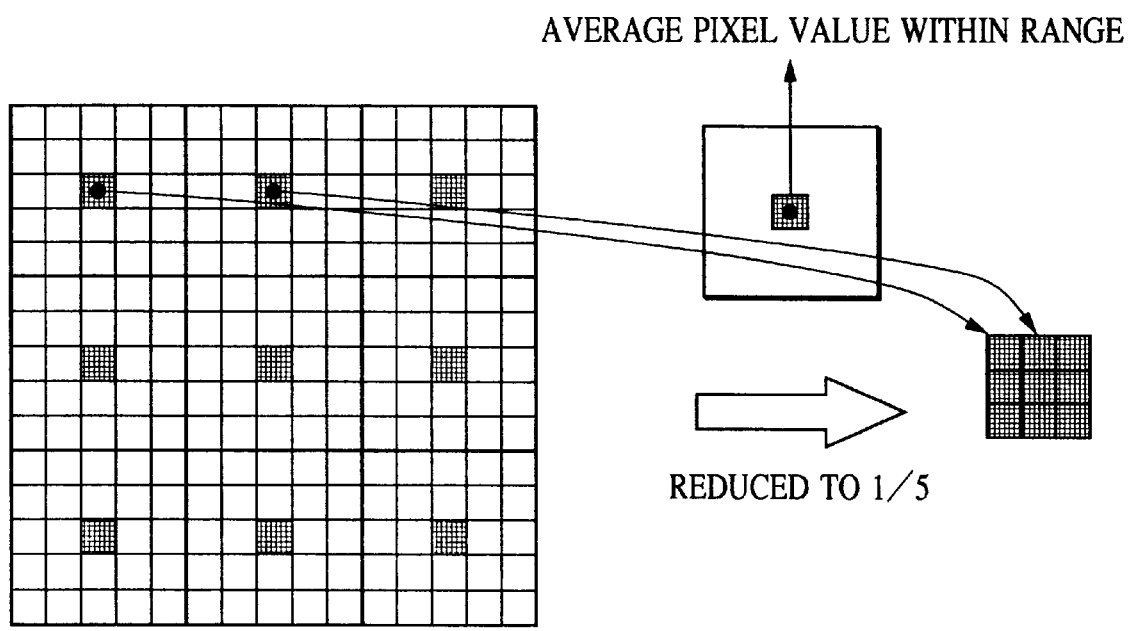
FIG. 3 is a diagram for describing an example of the step of reducing the number of pixels by extraction of average pixels executed in the image reduction step shown in FIG. 2.

Next, in the step for reducing image P4, a reduced image is created based on the rate of reduction h determined in the step for determining reduction ratio P2. That is, since the rate of reduction is h=5, the pixel value of a 5×5 pixel area in the input image is averaged to serve as the pixel value for the reduced image. FIG. 3 represents the average value of all pixels (25 pixels) within the 5×5 pixel area (the area enclosed by solid lines) being used as the pixel value for the reduced image.

Next, in the step for blurring reduced image P5, the input image data S0 is blurred by certain means, such as Expression (2). Subsequently, in the step for enlarging image P6, the blurred image S5 of the reduced image created in the step for blurring reduced image P5 is enlarged by a factor inverse to the rate of reduction h determined in the step for determining reduction ratio P2, i.e., h=5. Enlarging is performed by using a bilinear interpolation method, e.g., such as described in ("Introduction to Computer Image Processing"; compilation supervision by Tamura; Soken Shuppan).

Figure 4:
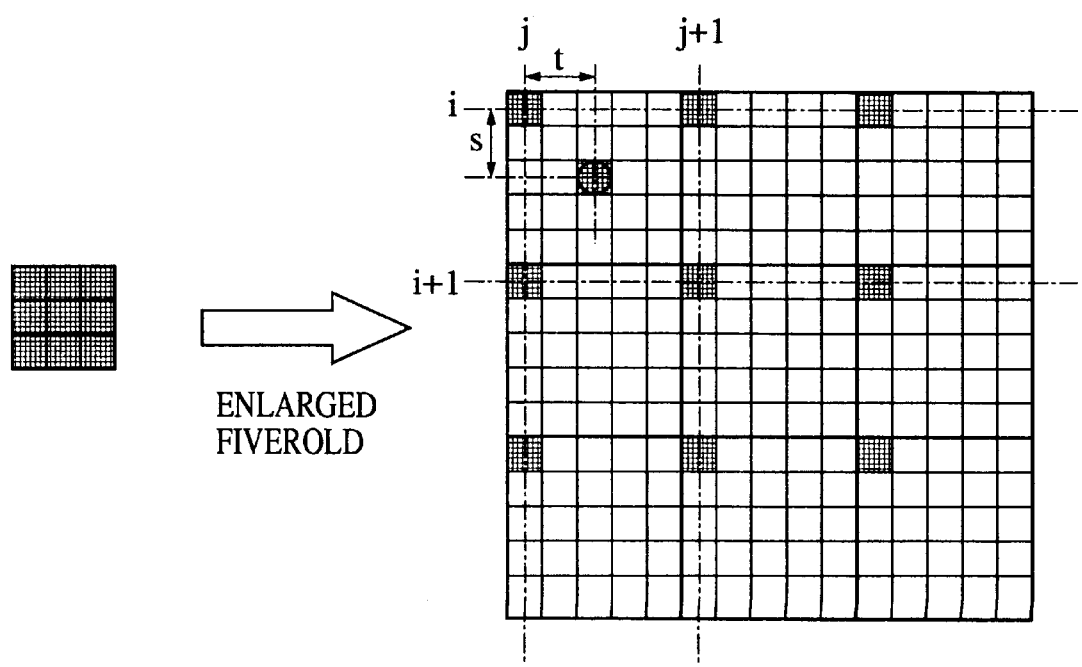
FIG. 4 is a diagram for describing the bilinear interpolation method executed in the image enlarging step shown in FIG. 2.

FIG. 4 shows an explanatory diagram of the linear interpolation method, wherein a 3×3 pixel area is enlarged to 15×15 pixels using the bilinear interpolation method.

The pixel value of (i+s, i+t): $0 \leq s, t \leq 1$ surrounded by four points, i.e., coordinates (i, j), (i+1, j), (i, j+1), and (i+1, j+1), is calculated by the bilinear interpolation method, and can be expressed as shown in the following Expression (4):

$$f(i+s, j+t) = f(i, j) \times (1-s) \times (1-t) + \qquad (4)$$
$$f(i+1, j) \times s \times (1-t) +$$
$$f(i, j+1) \times (1-s) \times t +$$
$$(i+1, j+1) \times s \times t$$

Although there are various enlarging methods other than the bilinear interpolation method, such as zero-order interpolation or cubic convolution interpolation, such methods are not appropriate when the object of creating a blurred image is considered, since these methods generate high-frequency components in the processing itself.

Next, a calculation will be made regarding the degree of reduction in the amount of computation. The number of calculations $C_{org}$ in the event that the input image is calculated with the amount of blurring for 15×15 pixels within any change can generally be calculated by the following Expression (5). This Expression (5) indicates that the number of calculations MN for creating one pixel in a blurred image is performed for processing the number of XY pixels.

$$C_{org} = MN \times XY = 15^2 XY = 225XY \qquad (5)$$

Then, the number of calculations $C_{min}$ with the creation of a reduced image is expressed in the following Expression (6):

$$C_{min} = h^2 \times (XY/h^2) + (NM/h^2) \times (XY/h^2) + \qquad (6)$$
$$16h^2 \times (XY/h^2)$$
$$= 17XY + (NMXY/h^4)$$
$$= 17XY + (9XY/25)$$
$$= 17.4XY$$

The first term in Expression (6) represents performing calculation $h^2$ times from the rate of reduction in order to obtain one pixel of the reduced image, performing this for the total number of pixels $XY/h^2$ in the reduced image. The second term represents the number of calculations for the process of blurring the reduced image, wherein the average value in the area of (N/h)×(M/h) within one pixel of the reduced image is calculated, and that this calculation is performed for (X/h)×(Y/h) pixels.

Also, the third term represents the number of calculations for enlarging the reduced image (X/h)×(Y/h) to x×Y pixels, wherein the pixel value for interpolation is calculated from the four surrounding pixels based on Expression (4) in order to obtain one pixel by the linear interpolation method, and that this calculation is performed for $h^2 \times (X/h) \times (Y/h)$ times. Thus, it can be understood from Expressions (5) and (6) that the amount of calculations can be reduced to about 1/12.

As described above, in order to create a blurred image, a reduced image of the input image is created, blurred processing is performed with the reduced image, and the reduced blurred image is enlarged to create the desired blurred image, whereby a blurred image equivalent to the cases wherein blurring processing is performed to an input image without change can be obtained with only a fraction of the amount of calculation required therefor.

The enlarged blurred image data is thus used as un-sharp signals in the step for image correction P7. Now, this step for image correction P7 uses image data which has been subjected to bilinear interpolation in the above image enlarging step, to perform image correcting processing such as described in the following example.

As a first example, it is possible to perform processing for emphasizing the edge (high-frequency component) in order to adjust the image quality of this image correction processing. That is, with the image data input in the above image input step P0 represented by f(X, Y), and the un-sharp signal represented by $f_{av}(X, Y)$, the processed image g(X, Y) such as shown in the above Expression (1) is calculated by an expression f(X, Y)+k×{f(X, Y)−$f_{av}$(X, Y)} (wherein k is a coefficient), and the high-frequency components of the required portion are emphasized.

As a next example, it is possible to perform filtering processing with the above un-sharp signal, for raising the image contrast of a certain portion, by using $f_{av}$(X, Y), as given in Expression (3).

Further, as a next example, it is possible to compare the above un-sharp signal with a separately-provided threshold value, and using this for area division of the photographed image. For example, in order to segment and distinguish between the lung portion and mediastinum, a histogram is made of input image signals, the value at the low point in the histogram is calculated, the un-sharp signals are digitized with this calculated value as the threshold, and the image is thus separated into two areas. Then, performing separate processing to each of the two separated areas corrects the overall image to an image which is appropriate for diagnosis.

In the above-described embodiment, an averaging manipulation method was used for reducing the input image in the step for reducing image P4, but in the event that the input image has the high-frequency components thereof sufficiently removed, simple sub-sampling of the image data will pose no problem for creating a blurred image.

Figure 5:
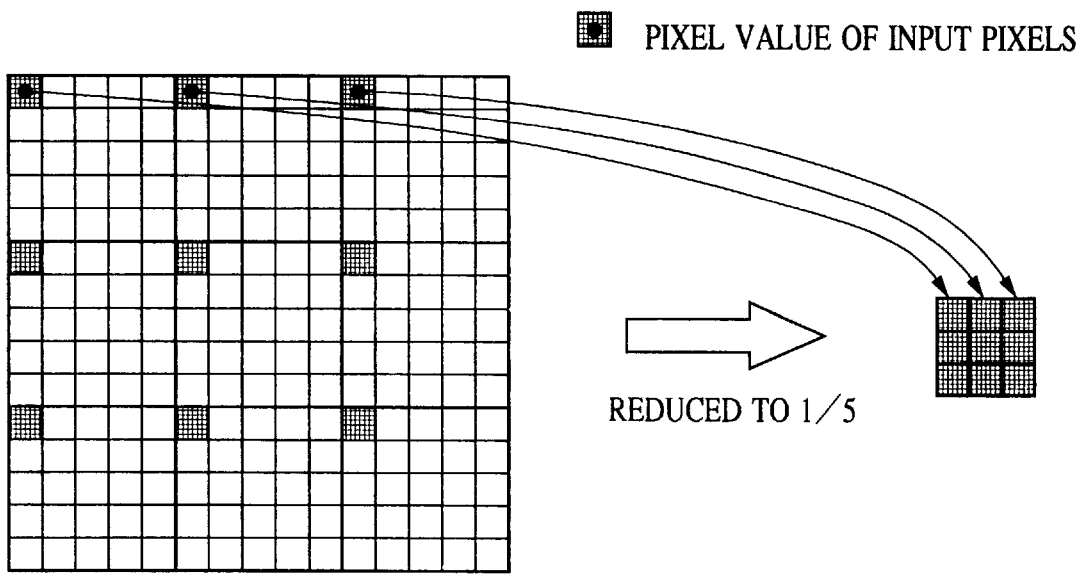
FIG. 5 is a diagram for describing another example of the step of reducing the number of pixels by extraction of average pixels executed in the image reduction step shown in FIG. 2.

FIG. 5 shows a diagram for describing the method of simply sub-sampling the input image. With a pixel within the 5×5 pixel area (surrounded by bold lines) as the pixel value for the reduced image, the number of calculations $C_{min}$ shown in Expression (6) can be expressed in the following Expression (7):

$$C_{min} = (XY/h_2) + (NM/h_2) \times (XY/h_2) + 16h_2 \times (XY/h_2) \quad (7)$$

$$= (XY/h_2) \times \{(1 + (NM/h_2)\} + 16XY$$

$$= (XY/25) \times (1 + 9) + 16XY$$

$$= 16.4XY$$

Using this method, the amount of calculations can be reduced to approximately 1/13 as compared with Expression (5), thus improving the calculation speed.

As described above, regarding a method wherein the number of pixels of an original image is temporarily reduced, following which blurring processing is performed on the image obtained by reducing the number of pixels, and the number of pixels of the blurred reduced image is increased to the original number of pixels, the image processing apparatus according to the above embodiment of the present invention allows for fewer calculations and higher speed, so that blurring image processing such as un-sharp masking or self-compensating filtering can be performed more efficiently.

Although in the above embodiment, image processing is carried out by software based on the CPU shown in FIG. 1, but the idea of the present invention can be similarly applied to apparatuses which perform image processing using hardware, as well.

FIG. 6 is a diagram illustrating an image processing apparatus according to another embodiment of the present invention, and in the Figure, 11 denotes an input terminal for the digital signal to be processed, and 12 denotes a block-forming circuit for separating the digital signals into blocks each comprised of (5×5) pixels, for example. More specifically, the block-forming circuit 12 is comprised of a buffer memory capable of storing at least five lines worth of image data, and is a circuit which changes the order of the image data being input to the buffer memory in the order of raster so that the data is sequentially output in units of blocks each comprised of (5×5) pixels.

The output of the block-forming circuit 12 is input into an average value calculating circuit 13, and the average of each 25 pixels, i.e., each block, is calculated in this circuit 13. Accordingly, the number of samples output by the average value calculating circuit 13 is 1/25 of the number of pixels input. 14 denotes a blurring circuit to which the average values output by the average value calculating circuit 13 are input, and which performs further filtering to the image of which the number of samples has been reduced so as to blur the overall image.

Of course, the number of samples output by this blurring circuit 14 is 1/25 of the number of samples of the input image, so that high-speed processing can be realized even if a quite complex digital filter is used for this blurring circuit 14, and the scale of the circuit can be substantially reduced. Next, the output of this blurring circuit 14 is stored in memory 15. Regarding writing to this memory 15, the addresses of the pixels to which interpolation is to be performed are skipped, a bilinear interpolation circuit 16 accesses the pixel data written to this memory 15, the interpolated pixels are subjected to linear calculation according to the aforementioned method, and the interpolated pixels are written to the remaining addresses.

Thus, the un-sharp image signals for one image stored in memory 15 are read out synchronously with the image signals for one image stored in memory 17, and input to an image quality adjusting processing circuit 18. This image quality adjusting processing circuit 18 performs image correction processing according to the calculating expressions such as the aforementioned Expressions (1) and (3), or performs different processing to the input signals according to the digitized un-sharp signals. The output of the image quality adjusting processing circuit 18 is supplied to an image output device such as a printer or display, via an output terminal 19.

Thus, even in an embodiment comprised of hardware, the processing speed of the overall apparatus can be improved by reducing the scale of the of the blurring circuit 14 and increasing the processing speed thereof at the same time.

What is claimed is:

1. An image processing apparatus for generating un-sharp signals from input image data representing an input image, comprising:

setting means for setting an amount of blur;

reduction ratio determining means for determining a reduction ratio for reducing an input image based on the amount of blur, wherein the reduction ratio is an integer which is not greater than the amount of blur, and by which the amount of blur is divisible;

amount of blur determining means for determining an amount of blur to be applied to a reduced input image based on the amount of blur set by said setting means and the reduction ratio;

reducing means for reducing the input image based on the reduction ratio in order to produce a reduced input image;

blurring means for performing blurring processing to the reduced input image, using the amount of blur determined by said amount of blur determining means;

enlarging means for performing enlarging processing to the reduced input image having been processed in said blurring processing and outputting the un-sharp signals, wherein the un-sharp signals have a pixel density or a number of pixels which is equal to that of the input image; and image processing means for performing image processing to the input image using the un-sharp signals.

2. An image processing apparatus according to claim 1, wherein said enlarging means performs said enlarging processing using bilinear interpolation.

3. An image processing apparatus according to claim 2, wherein said reducing means includes average value calculating means for calculating the average value of a plurality of pixels within said input image data, and outputting said average value instead of said plurality of pixels.

4. An image processing apparatus according to claim 2, wherein said reducing means includes extracting means for extracting only one pixel from the plurality of pixels in said input image data, and outputting only the extracted pixel instead of said plurality of pixels.

5. An image processing apparatus according to claim 1, wherein said image processing means performs image correction to the input image data using the un-sharp signals.

6. An image processing apparatus according to claim 5, wherein said image processing means performs the image correction which emphasizes the high-frequency components of said input image data.

7. An image processing apparatus according to claim 5, wherein said image processing means performs processing which emphasizes a contrast of said input image data.

8. An image processing apparatus according to claim 1, wherein said image processing means segments the input image data into a plurality of areas based on the un-sharp signals.

9. An image processing apparatus according to claim 1, wherein said blurring means is comprised of software.

10. An image processing apparatus according to claim 1, wherein said blurring means is comprised of digital filters using hardware.

11. An image processing method of generating un-sharp signals from input image data representing an input image, comprising:

a setting step of setting an amount of blur;

a reduction ratio determining step of determining a reduction ratio for reducing an input image based on the amount of blur, wherein the reduction ratio is an integer which is not greater than the amount of blur, and by which the amount of blur is divisible;

an amount of blur determining step of determining an amount of blur to be applied to a reduced input image based on the amount of blur set by said setting step and the reduction ratio;

a reducing step of reducing the input image based on the reduction ratio in order to produce a reduced input image;

a blurring step of performing blurring processing to the reduced input image, using the amount of blur determined by said amount of blur determining step;

an enlarging step of performing enlarging processing to the reduced input image having been processed in said blurring processing and outputting the un-sharp signals, wherein the un-sharp signals have a pixel density or a number of pixels which is equal to that of the input image;

an image processing step of performing image processing to the input image using the un-sharp signals.

12. An image processing method according to claim 11, wherein said enlarging step performs said enlarging processing using bilinear interpolation.

13. An image processing method according to claim 12, wherein said reducing step calculates the average value of a plurality of pixels within said input image signals, and outputting said average value instead of said plurality of pixels.

14. An image processing method according to claim 12, wherein said reducing step extracts only one pixel form the plurality of pixels in said input image signals, and outputting only the extracted pixel instead of said plurality of pixels.

15. An image processing method according to claim 11, wherein said image processing step performs image correction to the input image data using the un-sharp signals.

16. An image processing method according to claim 15, wherein said image processing step performs the image correction which emphasizes the high-frequency components of said input image data.

17. An image processing method according to claim 15, wherein said image process step performs processing which emphasizes a contrast of said input image data.

18. An image processing apparatus according to claim 11, wherein said image processing step segments the input image data into a plurality of areas based on the un-sharp signals.

* * * * *